(12) United States Patent
Kim

(10) Patent No.: US 7,814,506 B2
(45) Date of Patent: Oct. 12, 2010

(54) TURNTABLE ALLOWING EASY ASSEMBLY OF MAGNETIZING YOKE

(75) Inventor: Nam Seok Kim, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 867 days.

(21) Appl. No.: 11/639,321

(22) Filed: Dec. 15, 2006

(65) Prior Publication Data

US 2007/0150911 A1    Jun. 28, 2007

(30) Foreign Application Priority Data

Dec. 27, 2005    (KR) .................... 10-2005-0130393

(51) Int. Cl.
*G11B 17/028* (2006.01)
*G11B 19/20* (2006.01)
*F16F 15/22* (2006.01)

(52) U.S. Cl. ..................................... 720/702
(58) Field of Classification Search ................ 720/702; 369/264; 310/51

See application file for complete search history.

(56) References Cited

U.S. PATENT DOCUMENTS

| 6,249,505 B1 * | 6/2001 | Miyamoto et al. .......... 369/266 |
| 6,252,319 B1 * | 6/2001 | Sudo et al. ................. 310/67 R |
| 6,479,912 B2 * | 11/2002 | Kikuchi et al. ................. 310/51 |
| 6,525,441 B2 | 2/2003 | Yamaguchi |
| 2003/0117935 A1 * | 6/2003 | Utsumi et al. ................ 369/263 |
| 2003/0123375 A1 | 7/2003 | Uno et al. |
| 2005/0223400 A1 * | 10/2005 | Matsushita et al. .......... 720/702 |

* cited by examiner

*Primary Examiner*—Angel A. Castro

(57) ABSTRACT

Disclosed herein is a turntable allowing easy assembly of a magnetizing yoke, which includes a central guide part for helping seat a disc on the turntable, and a balancing part extending from the central guide part in a circumferential direction thereof and balancing the disc. In this case, the central guide part has an annular opening to which the magnetizing yoke is detachably coupled. The central guide part includes at least one coupling protrusion provided on a sidewall of the central guide part exposed to the annular opening, and the magnetizing yoke includes at least one coupling part which is provided along an edge of the magnetizing yoke and corresponds to the coupling protrusion. Further, the coupling part includes a coupling hole corresponding to the coupling protrusion, and a protrusion seat in close contact with the coupling protrusion. The protrusion seat is formed to be inclined downwards toward the coupling hole.

18 Claims, 4 Drawing Sheets

TURNTABLE ALLOWING EASY ASSEMBLY OF MAGNETIZING YOKE

CROSS REFERENCE TO RELATED APPLICATION(S)

This application claims the benefit of Korean Patent Application No. 10-2005-0130393, filed Dec. 27, 2005, entitled "Turn table having a york being easily assembled thereinto", which is hereby incorporated by reference in its entirety into this application.

BACKGROUND OF THE INVENTION

1. Field of the Invention

The present invention relates generally to turntables and, more particularly, to a turntable allowing easy assembly of a magnetizing yoke on which a clamping magnet is seated to clamp a disc.

2. Description of the Related Art

As well known to those skilled in the art, a turntable is mounted to a disc drive device, and is rotated by a drive means including a spindle motor, thus rotating a disc mounted on the turntable. An example of a turntable is shown in FIG. 5.

As shown in FIG. 5, a conventional turntable 200 includes a main body 210 and a ball cover 280 which covers the lower portion of the main body 210.

The main body 210 includes a central guide part 220 and an annular balancing part 250. The central guide part 220 serves to guide the center of the disc, thus helping seat the disc on the turntable. The annular balancing part 250 extends integrally from the central guide part 220 in a circumferential direction thereof, and prevents imbalance caused by eccentricity of the disc when it is rotated.

The central guide part 220 has on a center thereof a shaft mounting hole 221 so that a rotating shaft of a drive means is inserted into the shaft mounting hole 221. An annular opening 222 is formed outside the shaft mounting hole 221.

A magnetizing yoke 230 is disposed in the annular opening 222, and a clamping magnet 240 for clamping the disc is provided on the yoke 230. In this case, protrusions 223 which protrude from the opening 222 penetrate the magnetizing yoke 230. One end of each protrusion 223 is pressed through heat fusion or the like, in order to secure the magnetizing yoke 230 to the central guide part 220.

Annular partition walls 251 and 252 protrude from the lower surface of the annular balancing part 250, thus defining space 254 for storing a plurality of balls 260 for balancing.

The ball cover 280 is provided to prevent the balls 260 from escaping to the outside. The outer wall of the ball cover 280 is inserted into a gap between the partition walls 251 and 252, so that the ball cover 280 is coupled to the balancing part 250.

However, the conventional turntable 200 constructed as described above is problematic in that the protrusions 223 must be pressed through heat fusion or the like to couple the magnetizing yoke 230 to the turntable 200, and thus it is difficult to assemble the magnetizing yoke 230 with the turntable 200. The conventional turntable has another problem in that after the magnetizing yoke 230 has been assembled with the turntable 200, it is difficult to replace the magnetizing yoke 230 with another one.

SUMMARY OF THE INVENTION

Accordingly, the present invention has been made keeping in mind the above problems occurring in the prior art, and an object of the present invention is to provide a turntable, in which a magnetizing yoke is detachably coupled to a central guide part of the turntable, thus making it easy to assemble the magnetizing yoke with the turntable, and making it easy to replace the magnetizing yoke with another one after the assembly thereof has been completed.

In order to accomplish the above object, the present invention provides a turntable allowing easy assembly of a magnetizing yoke, which includes a central guide part for helping seat a disc on the turntable, and a balancing part extending from the central guide part in a circumferential direction thereof, and balancing the disc, wherein the central guide part has an annular opening to which the magnetizing yoke is detachably coupled.

In this case, the central guide part includes at least one coupling protrusion provided on a sidewall of the central guide part exposed to the annular opening, and the magnetizing yoke includes at least one coupling part which is provided along an edge of the magnetizing yoke and corresponds to the coupling protrusion.

Further, the coupling part includes a coupling hole corresponding to the coupling protrusion, and a protrusion seat in close contact with the coupling protrusion. The protrusion seat is formed to be inclined downwards toward the coupling hole.

Further, the balancing part has on a lower surface thereof a ball holding space for holding a plurality of balls, the ball holding space being closed by a ball cover which is detachably coupled to the balancing part.

In this case, the balancing part includes a plurality of protrusions which are provided on an inner wall defining the ball holding space at regular intervals and distribute the plurality of balls.

Further, a ball seating surface of the ball cover is inclined downwards toward a center of the balancing part, the seating surface having a plurality of ball distributing protrusions to distribute the plurality of balls.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a turntable allowing easy assembly of a magnetizing yoke, according to the preferred embodiment of the present invention, will be described in detail with reference to the accompanying drawings.

Figure 1:
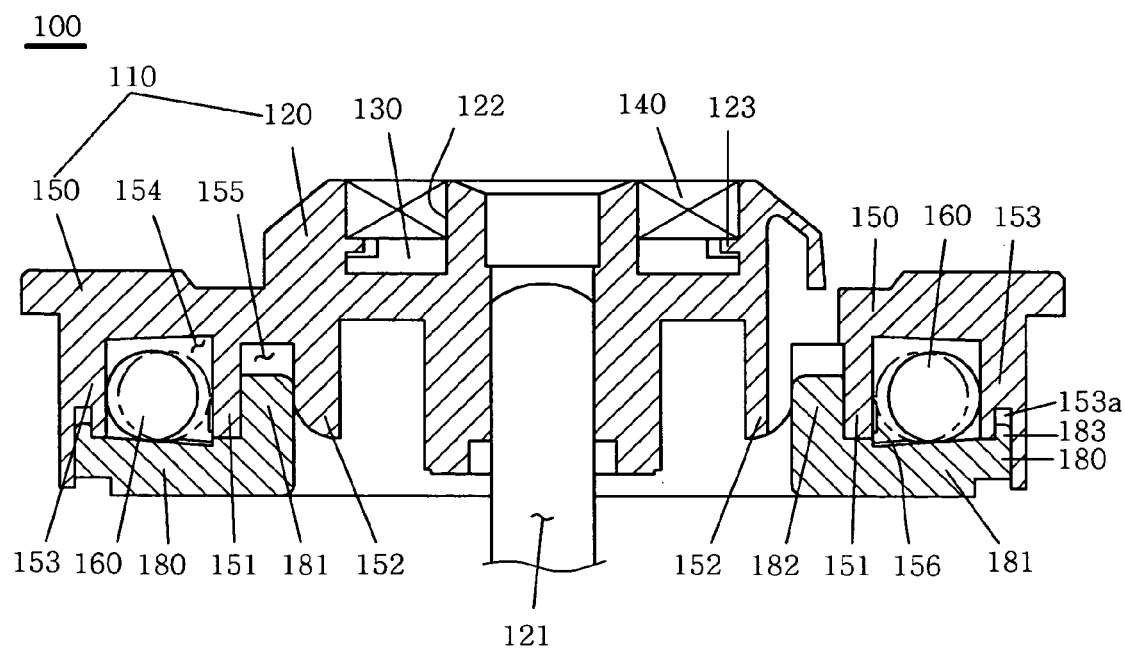
FIG. 1 is a schematic sectional view showing a turntable, according to the preferred embodiment of the present invention.
Figure 2:
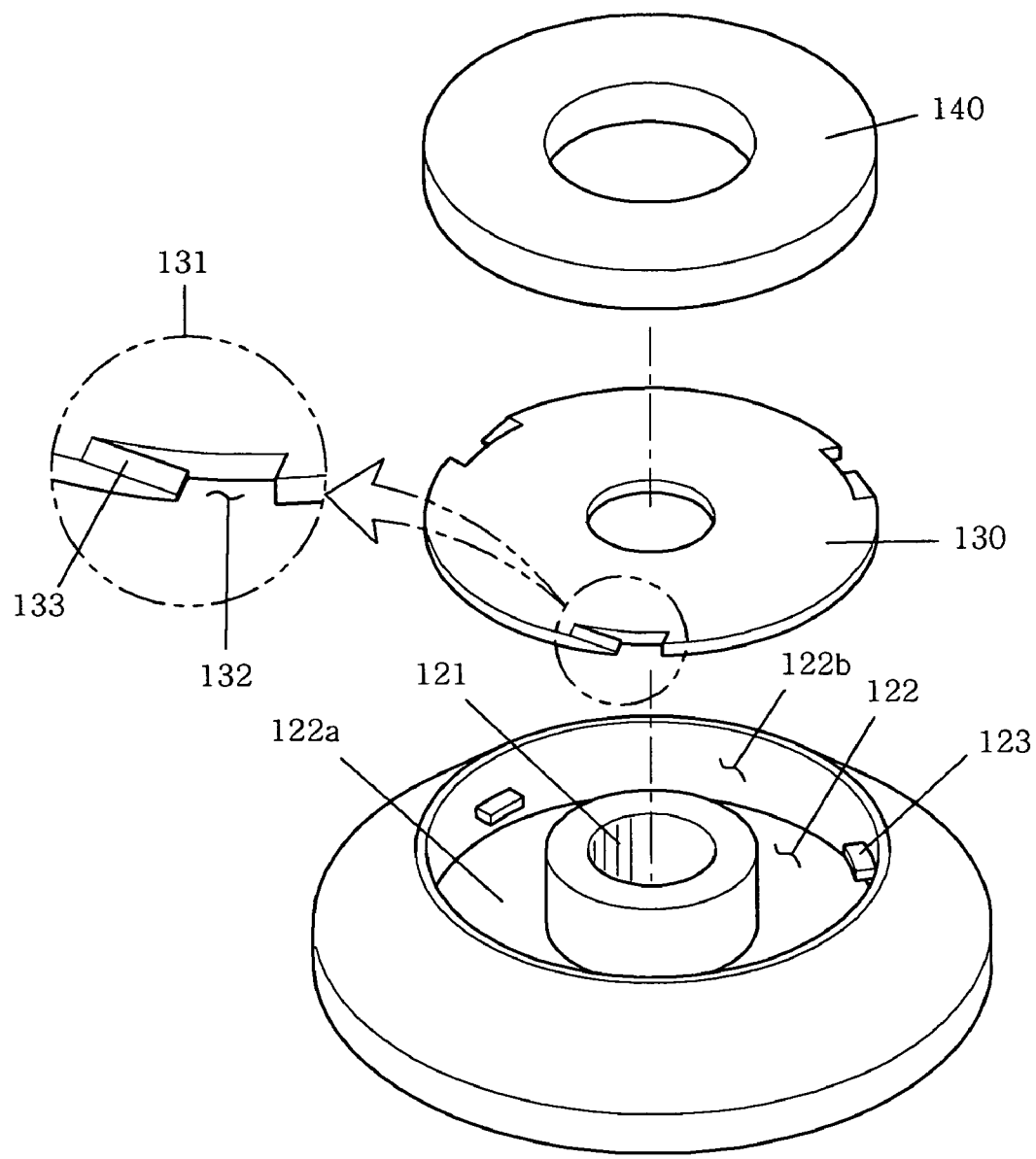
FIG. 2 is a schematic exploded perspective view showing a clamping magnet, a magnetizing yoke, and a central guide part of FIG. 1.
Figure 3:
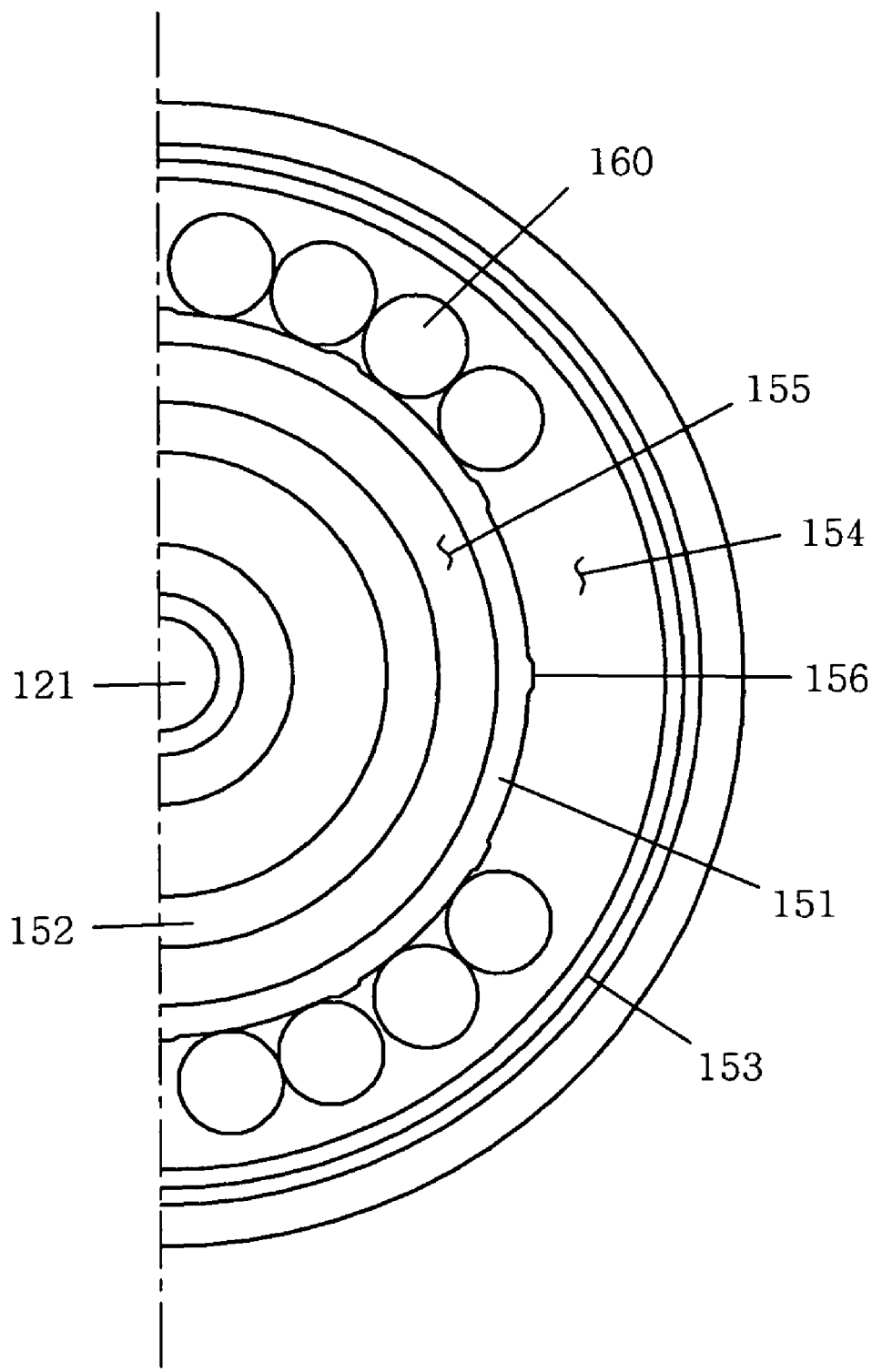
FIG. 3 is a bottom plan view showing the turntable of FIG. 1.
Figure 4:
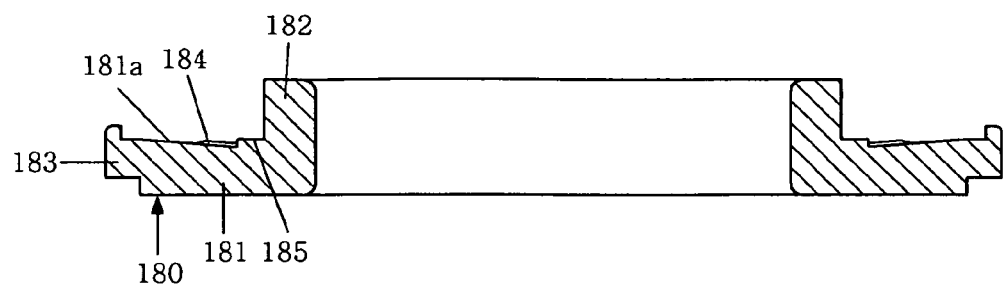
FIG. 4 is a schematic sectional view showing a ball cover of FIG. 1.
Figure 5:
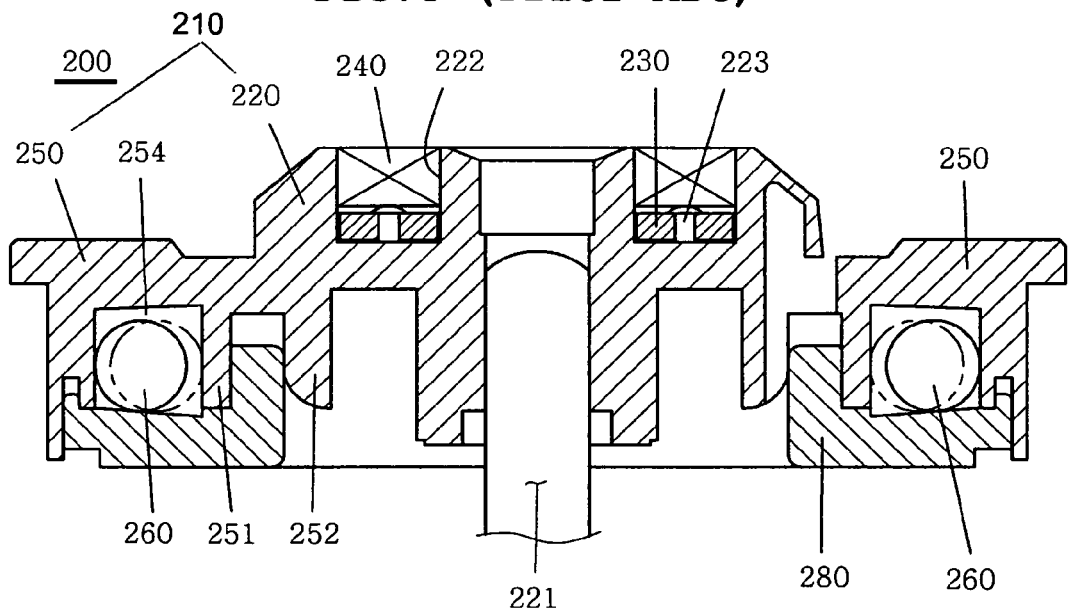
FIG. 5 is a schematic sectional view showing a conventional turntable.

FIG. 1 is a schematic sectional view showing a turntable, according to the preferred embodiment of the present invention, FIG. 2 is a schematic exploded perspective view showing a clamping magnet, a magnetizing yoke, and a central guide part of FIG. 1, FIG. 3 is a bottom plan view showing the turntable of FIG. 1, and FIG. 4 is a schematic sectional view showing a ball cover of FIG. 1.

As shown in FIGS. 1 to 4, a turntable 100 according to this embodiment includes a disc-shaped main body 110 and an annular ball cover 180 which covers the bottom of the main body 110.

The disc-shaped main body 110 has a central guide part 120 and an annular balancing part 150. The central guide part 120 is provided on the center of the main body 110 in such a way as to protrude outwards. The annular balancing part 150 extends radially from the outer circumference of the central guide part 120.

The central guide part 120 serves to guide the center of a disc, which is not shown in the drawings, thus helping seat the disc on the turntable. For easy placement of the disc around the central guide part 120, the circumferential edge of the central guide part 120 is rounded.

Further, a shaft mounting hole 121 is formed in the central guide part 120 to pass through a central axis thereof. Thus, a rotating shaft of a drive means (not shown) is inserted into the shaft mounting hole 121. An annular opening 122 is formed in the central guide part 120 in such a way that the shaft mounting hole 121 is located at the center of the central guide part 120.

Further, the central guide part 120 has one or more coupling protrusions 123 provided on an inner circumferential wall 122b exposed to the annular opening 122.

These coupling protrusions 123 are provided on the central guide part 120 and spaced apart from the bottom surface 122a of the central guide part 120 by a predetermined distance. The three coupling protrusions 123 are arranged at an angular interval of about 120 degrees.

According to this embodiment, the three coupling protrusions 123 are formed at an angular interval of about 120 degrees. However, unlike this embodiment, two coupling protrusions may be formed at an angular interval of 180 degrees. Further, four coupling protrusions may be formed at an angular interval of 90 degrees.

In this case, each coupling protrusion 123 may have the shape of a rectangular plate having a predetermined thickness. Preferably, the coupling protrusion 123 may be formed such that the edge thereof has the shape of an arc having the same curvature as that of the inner circumferential wall 122b. More preferably, the coupling protrusion 123 may be shaped to correspond to the outer circumference of a magnetizing yoke 130.

The magnetizing yoke 130 is disposed in the annular opening 122, and a doughnut-shaped clamping magnet 140 for clamping the disc is seated on the magnetizing yoke 130.

The magnetizing yoke 130 has the shape of a disc, with a plurality of coupling parts 131 formed along the outer edge of the magnetizing yoke 130 and spaced apart from each other by a predetermined interval.

Each coupling part 131 includes a coupling hole 132 which corresponds to each coupling protrusion 123 provided on the central guide part 120, and a protrusion seat 133 which is in close contact with the coupling protrusion 123.

Here, each protrusion seat 133 is inclined downwards to the coupling hole 132, thus allowing the coupling part 131 to be easily coupled to the corresponding coupling protrusion 123.

The magnetizing yoke 130 constructed as described above is inserted into the central guide part 120 so that the coupling protrusions 123 are fitted into the corresponding coupling holes 132. Afterwards, the magnetizing yoke 130 is rotated in the counterclockwise direction when viewing the drawing so that the protrusion seats 133 come into close contact with the corresponding coupling protrusions 123. In this way, the magnetizing yoke 130 is coupled to the central guide part 120.

Thus, by rotating the magnetizing yoke 130 in the counterclockwise direction or the clockwise direction, the magnetizing yoke 130 can be easily assembled with or detached from the turntable 100. Further, since part of the outer circumferential edge of the magnetizing yoke 130 is in close contact with the lower portions of the plurality of coupling protrusions 123 formed on the inner circumferential wall 122b of the central guide part 120, the magnetizing yoke 130 is secured to the central guide part 120.

As shown in the plan view of FIG. 3, the annular balancing part 150 extends integrally from the central guide part 120 in the circumferential direction thereof, and prevents imbalance caused by the eccentricity of the disc when it is rotated. A double partition wall, that is, annular first and second partition walls 151 and 152, protrude from the lower surface of the annular balancing part 150. An annular edge part 153 is formed outside the first partition wall 151 and is spaced apart therefrom by a predetermined interval.

In this case, the annular balancing part 150 has space defined between the edge part 153 and the first partition wall 151, that is, has a ball holding space 154 holding a plurality of balls 160 for balancing. The annular balancing part 150 has space defined between the first partition wall 151 and the second partition wall 152, that is, a cover insertion space 155 into which the ball cover 180 is inserted.

Further, the balancing part 150 has a plurality of protrusions 156, which are provided on the inner wall of the first partition wall 151, that is, the wall of the ball holding space 154, at regular intervals.

The plurality of protrusions 156 serve to uniformly distribute the balls 160 held in the ball holding space 154, thus preventing the plurality of balls 160 from aggregating at one side. Thus, the turntable 100 can smoothly solve the imbalance caused by the eccentricity of the disc, through the balancing operation of the plurality of balls 160.

Preferably, when the protrusions 156 contact the balls 160, the upper end of each protrusion 156 is located at the center of each ball 160. The side of each protrusion 156 is preferably formed to be inclined, thus allowing the balls 160 to be easily seated between the protrusions 156.

Further, the interval between the protrusions 156 is not limited to a specific distance. However, the interval between the protrusions 156 is preferably set such that two or three balls 160 may be seated together between adjacent protrusions 156. According to this embodiment, the interval between the protrusions 156 is designed such that the two balls 160 are seated together between the protrusions 156.

Further, an annular mounting groove 153a is formed on the lower end of the circumference of the annular edge part 153, and an outer raised part 183 of the ball cover 180 is fitted into the mounting groove 153a.

The ball cover 180 prevents the balls 160 from escaping from the ball holding space 154. The ball cover 180 includes an annular bottom 181, an inner raised part 182 which is raised up from the inner circumference of the bottom 181, and the outer raised part 183 which is raised up from the outer circumference of the bottom 181.

The bottom 181 is inclined downwards in a direction from the outer raised part 183 to the inner raised part 182. A plurality of ball distributing protrusions 184 is provided at a position adjacent to the inner raised part 182 on a seating surface 181a. Further, an annular step 185 is provided adjacent to the inner raised part 182.

Preferably, the step 185 has a width equal to the thickness of the first partition wall 151 of the annular balancing part 150.

The ball distributing protrusions 184 are formed at regular intervals, similarly to the plurality of protrusions 156 which are formed on the first partition wall 151 of the annular balancing part 150. The free end of each ball distributing protrusion 184 is inclined so as to increase the area in contact with the ball 160.

Further, the interval between the ball distributing protrusions 184 is set such that two or three balls 160 are seated between the ball distributing protrusions 184, similarly to the interval between the protrusions 156.

The ball distributing protrusions 184 prevent the plurality of balls 160 held in the ball holding space 154 from aggregating at one side, thus uniformly distributing the balls 160.

The inner raised part 182 is coupled to the balancing part 150 by fitting the inner raised part 182 into the cover insertion space 155 defined between the first partition wall 151 and the second partition wall 152 of the annular balancing part 150.

In this case, when the inner raised part 182 is fitted into the cover insertion space 155, the first partition wall 151 and the second partition wall 152 are slightly bent, respectively, toward the central axis and in a direction opposite the central axis. That is, the first partition wall 151 and the second partition wall 152 are in close elastic contact with the inner raised part 182.

The outer raised part 183 extends upwards from the outer circumference of the bottom 181, and is fitted into the mounting groove 153a formed on the edge part 153 of the annular balancing part 150. As such, the inner raised part 182 and the outer raised part 183 are fitted into the cover insertion space 155 and the mounting groove 153a of the annular balancing part 150, so that the ball cover 180 is secured to the balancing part 150 of the main body 110.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention provides a turntable, in which a magnetizing yoke is detachably mounted to a central guide part of the turntable, so that the assembly is easy, the assembling period can be reduced, and it is possible to replace the magnetizing yoke with another one after the assembly has been completed.

Further, the present invention provides a turntable, in which a plurality of protrusions is formed on a balancing part and a ball cover, so that the plurality of balls does not collect at one side but is uniformly distributed, thus allowing the balancing of the turntable to be smoothly performed.

What is claimed is:

1. A turntable allowing easy assembly of a magnetizing yoke, comprising:
    a central guide part for helping seat a disc on the turntable;
    a balancing part extending from the central guide part in a circumferential direction thereof, and balancing the disc;
    a ball seating surface of the ball cover is inclined downwards toward a center of the balancing part, the seating surface having a plurality of ball distributing protrusions to distribute, a plurality of balls; and
    a ball cover detachably coupled to the balancing part,
    wherein the central guide part has an annular opening to which the magnetizing yoke is detachably coupled,
    the balancing part comprises a plurality of protrusions provided on an inner wall defining a ball holding space at regular intervals, and distributing the plurality of balls, and
    the balancing part has on a lower surface thereof the ball holding space for holding the plurality of balls, the ball holding space being closed by the ball cover, which is detachably coupled to the balancing part.

2. A turntable allowing easy assembly of a magnetizing yoke, comprising:
    a central guide part for helping seat a disc on the turntable; and
    a balancing part extending from the central guide part in a circumferential direction thereof, and balancing the disc,
    wherein the central guide part comprises an annular opening to which the magnetizing yoke is detachably coupled and at least one coupling protrusion provided on a sidewall of the central guide part exposed to the annular opening, and the magnetizing yoke comprises at least one coupling part which is provided along an edge of the magnetizing yoke and corresponds to the coupling protrusion.

3. The turntable as set forth in claim 2, wherein the balancing part has on a lower surface thereof a ball holding space for holding a plurality of balls, the ball holding space being closed by a ball cover which is detachably coupled to the balancing part.

4. The turntable as set forth in claim 3, wherein the balancing part comprises:
    a plurality of protrusions provided on an inner wall defining the ball holding space at regular intervals, and distributing the plurality of balls.

5. The turntable as set forth in claim 3, wherein a ball seating surface of the ball cover is inclined downwards toward a center of the balancing part, the seating surface having a plurality of ball distributing protrusions to distribute the plurality of balls.

6. The turntable as set forth in claim 2, wherein the coupling part comprises:
    a coupling hole corresponding to the coupling protrusion; and
    a protrusion seat in close contact with the coupling protrusion.

7. The turntable as set forth in claim 6, wherein the balancing part has on a lower surface thereof a ball holding space for holding a plurality of balls, the ball holding space being closed by a ball cover which is detachably coupled to the balancing part.

8. The turntable as set forth in claim 7, wherein the balancing part comprises:
    a plurality of protrusions provided on an inner wall defining the ball holding space at regular intervals, and distributing the plurality of balls.

9. The turntable as set forth in claim 7, wherein a ball seating surface of the ball cover is inclined downwards toward a center of the balancing part, the seating surface having a plurality of ball distributing protrusions to distribute the plurality of balls.

10. The turntable as set forth in claim 6, wherein the protrusion seat is formed to be inclined downwards toward the coupling hole.

11. The turntable as set forth in claim 10, wherein the balancing part has on a lower surface thereof a ball holding space for holding a plurality of balls, the ball holding space being closed by a ball cover which is detachably coupled to the balancing part.

12. The turntable as set forth in claim 11, wherein the balancing part comprises:
   a plurality of protrusions provided on an inner wall defining the ball holding space at regular intervals, and distributing the plurality of balls.

13. The turntable as set forth in claim 11, wherein a ball seating surface of the ball cover is inclined downwards toward a center of the balancing part, the seating surface having a plurality of ball distributing protrusions to distribute the plurality of balls.

14. A turntable allowing easy assembly of a magnetizing yoke, comprising:
   a central guide part for helping seat a disk on the turntable; and
   a balancing part extending from the central guide part in a circumferential direction thereof, and balancing the disc,
   wherein the central guide part has an annular opening to which the magnetized yoke is detachably coupled, wherein the balancing part comprises a plurality of protrusions provided on an inner wall defining a ball holding space at regular intervals, and distributing a plurality of balls; and the central guide part comprises at least one coupling protrusion provided on a sidewall of the central guide part exposed to the annular opening, and the magnetizing yoke comprises at least one coupling part which is provided along an edge of the magnetizing yoke and corresponds to the coupling protrusion.

15. The turntable as set forth in claim 14, wherein a ball seating surface of the ball cover is inclined downwards toward a center of the balancing part, the seating surface having a plurality of ball distributing protrusions to distribute the plurality of balls.

16. The turntable as set forth in claim 14, wherein the coupling part comprises:
   a coupling hole corresponding to the coupling protrusion; and
   a protrusion seat in close contact with the coupling protrusion.

17. The turntable as set forth in claim 16, wherein a ball seating surface of the ball cover is inclined downwards toward a center of the balancing part, the seating surface having a plurality of ball distributing protrusions to distribute the plurality of balls.

18. The turntable as set forth in claim 16, wherein the protrusion seat is formed to be inclined downwards toward the coupling hole.

\* \* \* \* \*